United States Patent
Douglas et al.

(10) Patent No.: US 10,929,280 B2
(45) Date of Patent: Feb. 23, 2021

(54) SCHEDULING TESTS OF SOFTWARE FOR A CLOUD COMPUTING ENVIRONMENT

(71) Applicant: Verizon Patent and Licensing Inc., Basking Ridge, NJ (US)

(72) Inventors: Benjamin Douglas, Marlborough, MA (US); Mark Babumoses, Woburn, MA (US); Robin C. Burr, West Townsend, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 698 days.

(21) Appl. No.: 14/204,442

(22) Filed: Mar. 11, 2014

(65) Prior Publication Data
US 2015/0261658 A1 Sep. 17, 2015

(51) Int. Cl.
*G06F 11/36* (2006.01)
*H04L 29/08* (2006.01)

(52) U.S. Cl.
CPC ...... *G06F 11/3688* (2013.01); *G06F 11/3664* (2013.01); *G06F 11/3672* (2013.01); *G06F 11/3684* (2013.01); *H04L 67/10* (2013.01)

(58) Field of Classification Search
CPC .......... G06F 11/3688; G06F 11/3664; G06F 11/3672; G06F 11/3684
See application file for complete search history.

(56) References Cited

U.S. PATENT DOCUMENTS

| | | | | |
|---|---|---|---|---|
| 5,854,823 A * | 12/1998 | Badger | ............... | H04L 12/2697 370/244 |
| 8,924,791 B2 * | 12/2014 | Gao | ................... | G06F 11/3664 714/38.14 |
| 2008/0104461 A1 * | 5/2008 | Khoche | ............... | G01R 31/319 714/724 |
| 2008/0146216 A1 * | 6/2008 | Newman | ............. | H04L 12/2697 455/424 |
| 2013/0152047 A1 * | 6/2013 | Moorthi | ............... | G06F 11/368 717/124 |
| 2013/0173962 A1 * | 7/2013 | Li | ....................... | G06F 11/3688 714/32 |
| 2013/0174117 A1 * | 7/2013 | Watters | .................... | G06F 8/71 717/106 |
| 2014/0109061 A1 * | 4/2014 | Gibbens | ............. | G06F 11/3688 717/126 |
| 2014/0109063 A1 * | 4/2014 | Schissel | ............... | G06F 11/368 717/127 |

* cited by examiner

*Primary Examiner* — Jigar P Patel

(57) ABSTRACT

A device receives, from a user device, a request to perform a test of software on a test device. The test device includes a device that simulates a device provided in a cloud computing environment, and the software includes software to be implemented in the cloud computing environment. The device determines whether the test device includes available resources to perform the test, and causes the request and the software to be provided to the test device when the test device includes the available resources to perform the test. The available resources are utilized to perform the test of the software and to generate results based on performance of the test. The device receives, from the test device, the results that include information indicating whether the software passed or failed the test. The device provides the results to the user device.

20 Claims, 12 Drawing Sheets

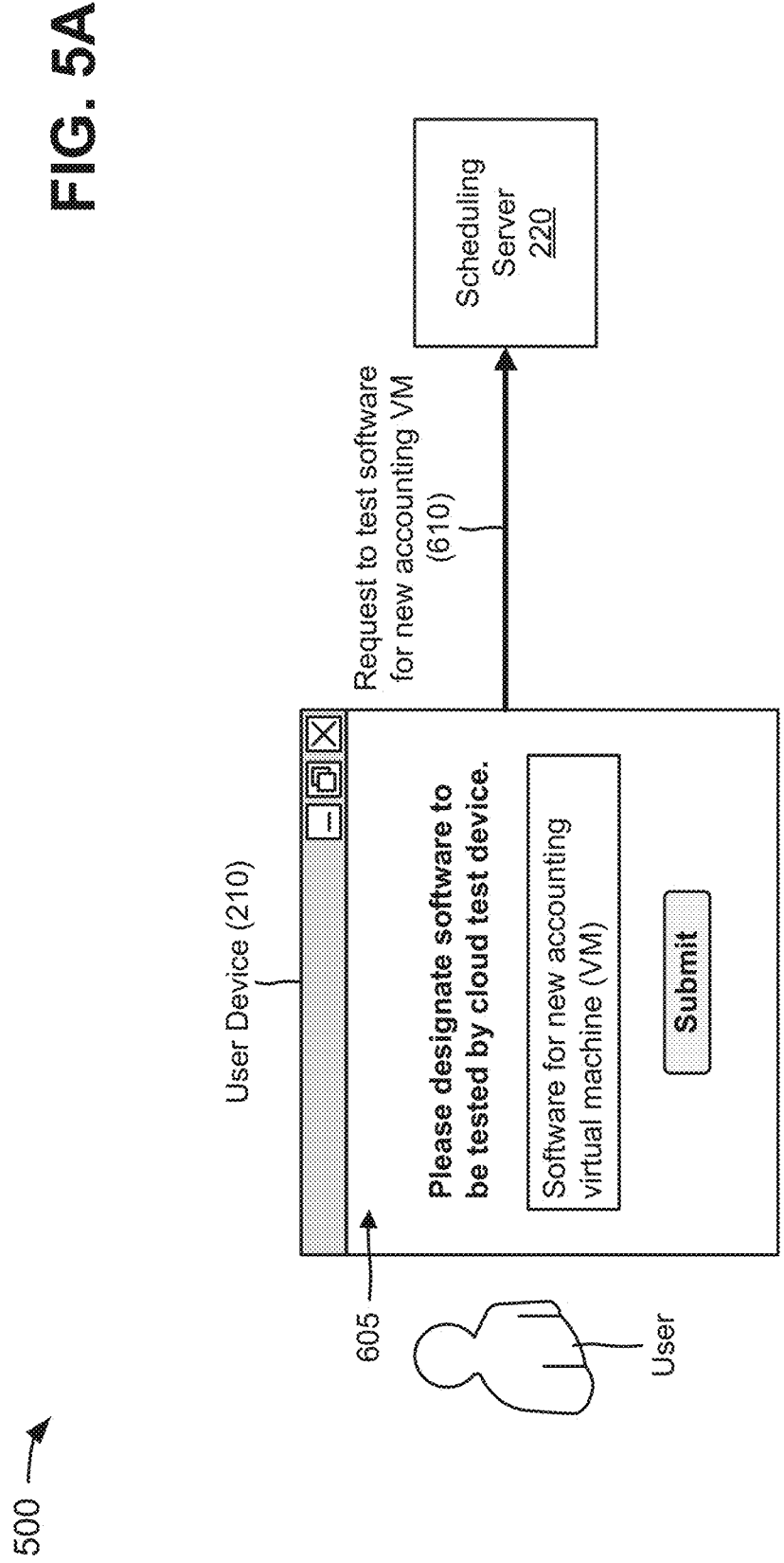

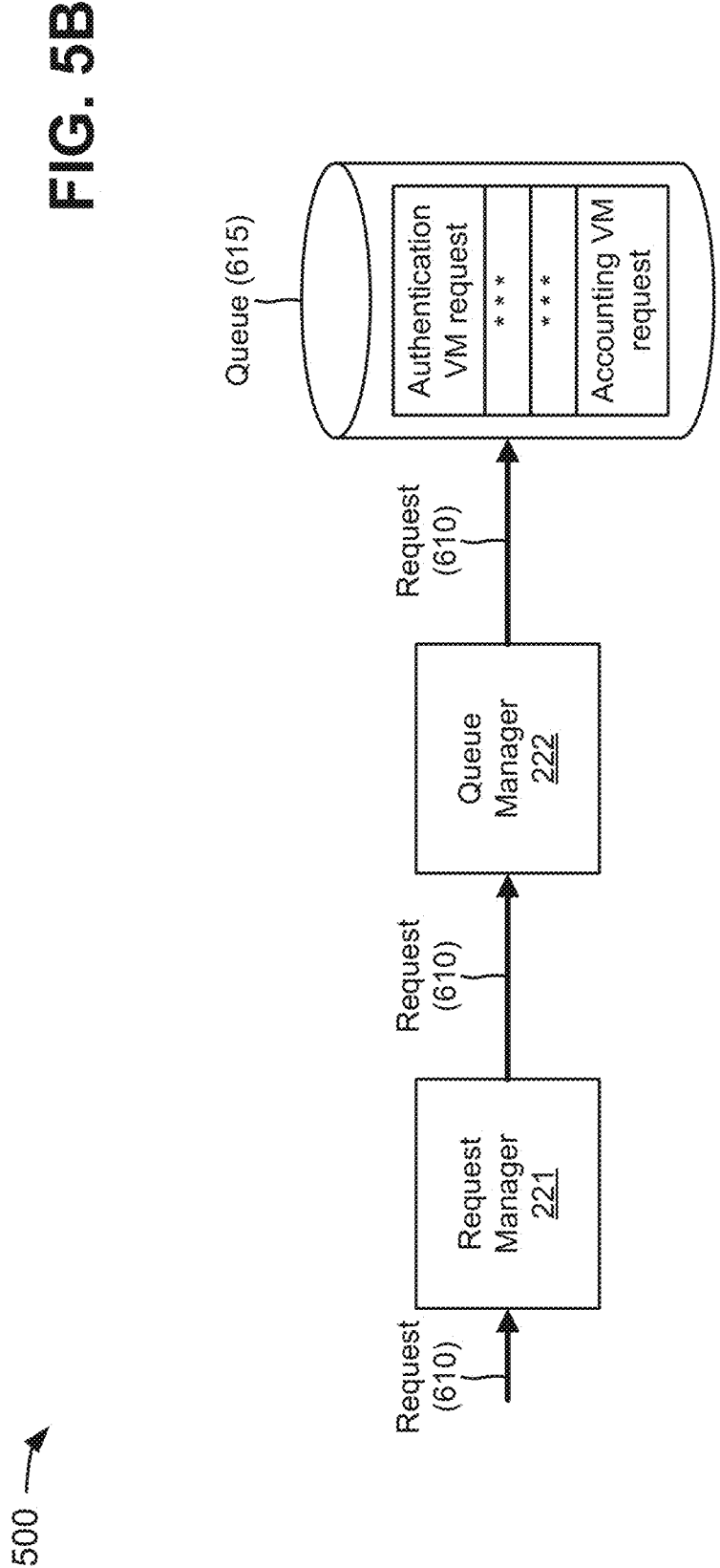

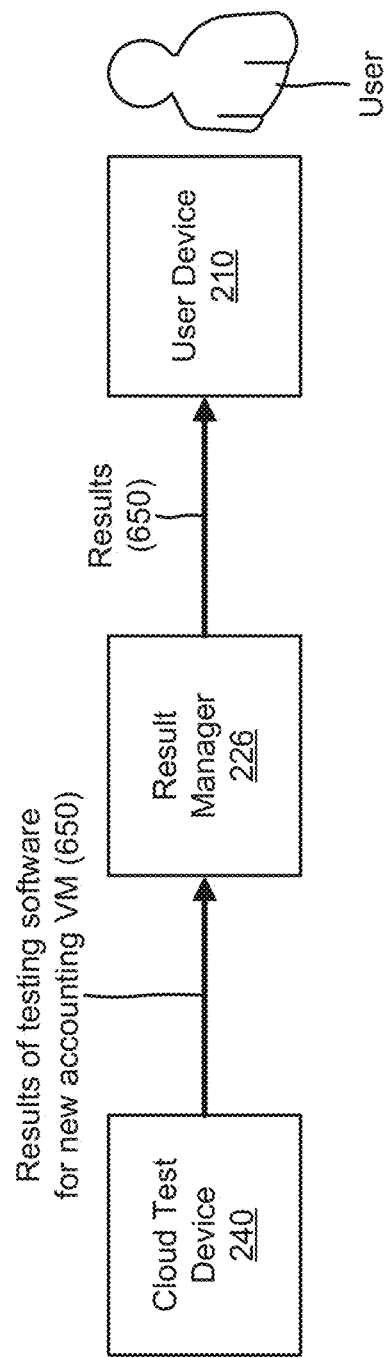

SCHEDULING TESTS OF SOFTWARE FOR A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services. The computing resources may include virtual machines (VMs) that provide software implementations of a physical machine and execute programs like a physical machine. The virtual machines may provide cloud computing services to the users.

BRIEF DESCRIPTION OF THE DRAWINGS

FIGS. 5A-5H are diagrams of an example relating to the example process shown in FIG. 4.

DETAILED DESCRIPTION OF PREFERRED EMBODIMENTS

The following detailed description refers to the accompanying drawings. The same reference numbers in different drawings may identify the same or similar elements.

Software for virtual machines or other components (e.g., applications, hypervisors, virtualized storage, etc.) of a cloud computing environment may be tested on a test device before being implemented in a device of the cloud computing environment. In some implementations, the test device may be similar to the device of the cloud computing environment, and may be an expensive piece of equipment. However, such an expensive test device may not be fully utilized to capacity. For example, assume that the test device is performing a first software test, and that a second software test is provided to the test device and is executed. In such an example, results of the first software test may be corrupted. A user of the test device may wait to execute the second software test even though the test device has resources (e.g., hardware, software, storage, computing power, etc.) available to execute the second software test without corrupting the first software test. Therefore, the test device may not be fully utilized to capacity.

Figure 1:
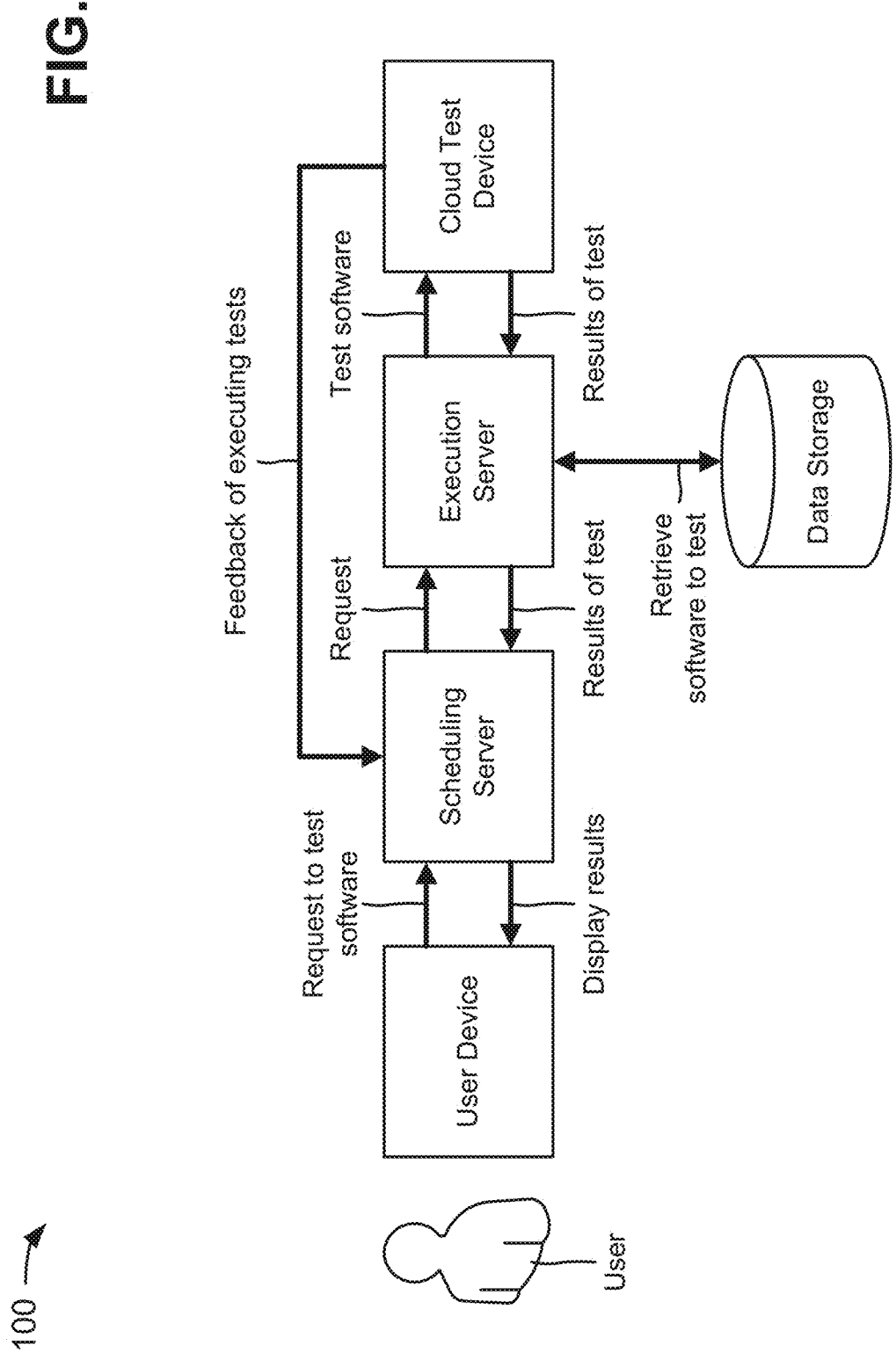
FIG. 1 is a diagram of an overview of an example implementation described herein.

FIG. 1 is a diagram of an overview of an example implementation 100 described herein. In example implementation 100, assume that a user associated with a user device wishes to test software on a cloud test device that is similar to a device of a cloud computing environment. As shown in FIG. 1, the user may cause the user device to generate a request to test the software, and to provide the request to a scheduling server. The scheduling server may receive the request, and may provide the request in a queue of requests to test other software on the cloud test device. The scheduling server may periodically monitor availability of resources of the cloud test device based on feedback associated with software tests being executed by the resources of the cloud test device, as further shown in FIG. 1.

When the scheduling server determines that the cloud test device is available, the scheduling server may provide a next request in the queue to an execution server. Eventually, the request to test the software (e.g., received from the user device) may be provided from the scheduling server (e.g., from the queue) to the execution server, as further shown in FIG. 1. The execution server may receive the request, and may retrieve the software (to be tested) from data storage associated with the execution server, based on the request. The execution server may provide the retrieved software to the cloud test device, and may instruct the cloud test device to test the software. In some implementations, the scheduling server may lock or prevent particular resources of the cloud test device, which are utilized to test the software, from being utilized by other tests. The cloud test device may test the software (e.g., by executing the software), and may generate results based on the test.

As further shown in FIG. 1, the cloud test device may provide the results of the test to the execution server, and the execution server may forward the results of the test to the scheduling server. The scheduling server may provide the results of the test to the user device, and the user device may display the results of the test to the user. In some implementations, the scheduling server may unlock the particular resources of the cloud test device so that other tests may utilize the particular resources of the cloud test device.

Systems and/or methods described herein may enable a cloud test device to be fully utilized for executing one or more tests of software to be implemented in a cloud computing environment. The systems and/or methods may automatically monitor the availability of resources of the cloud test device, and may automatically provide the one or more software tests to the cloud test device when resources are available to execute the one or more software tests. The systems and/or methods may prevent different software tests from corrupting results of other software tests being executed by the cloud test device, and may provide results of the software tests for display to a user(s) who requested the software tests. Although implementations are described herein in connection with performing tests in a cloud computing environment, the systems and/or methods may be utilized for performing tests in other types of environments where there is a pool of resources for executing the tests.

Figure 2:
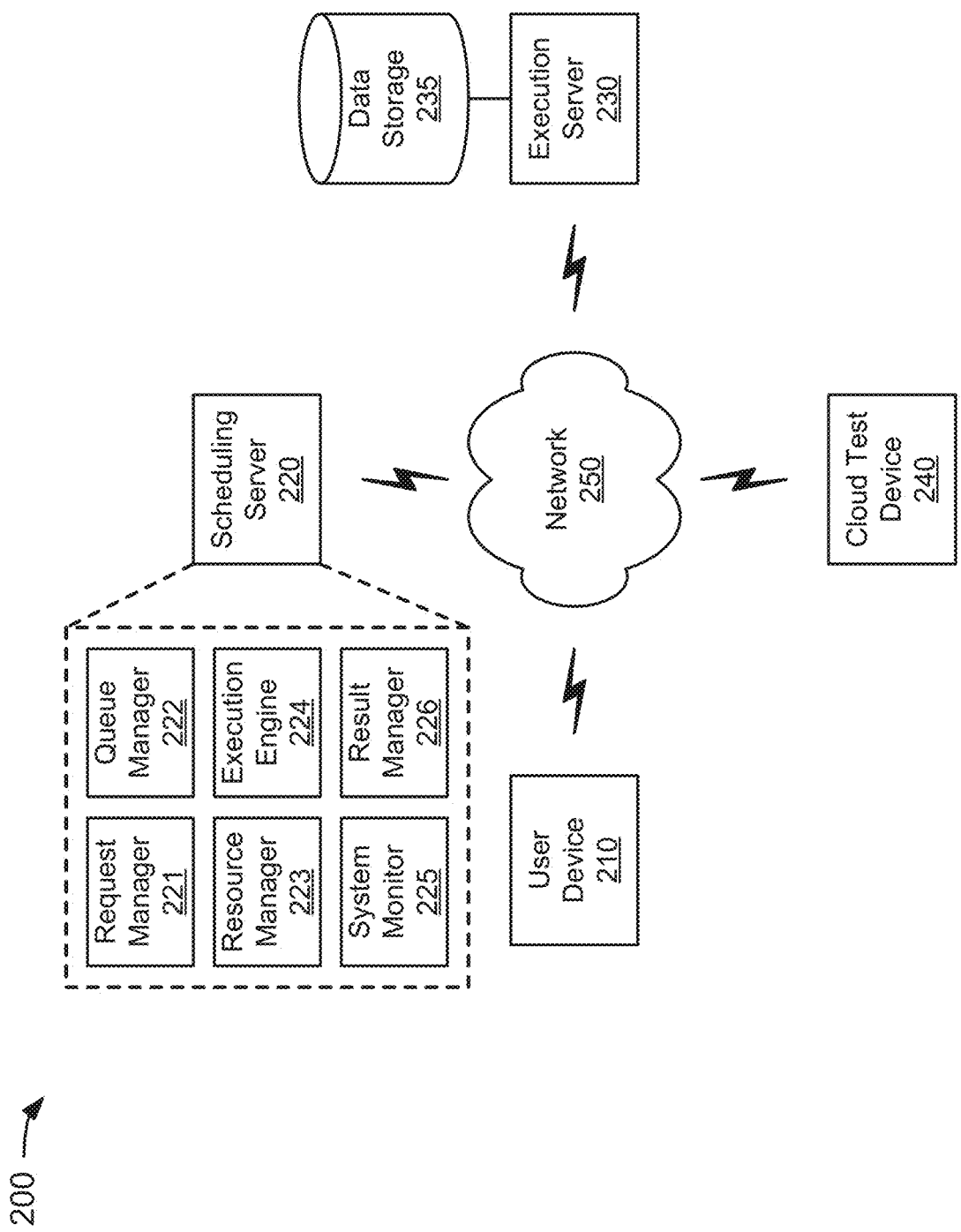
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, a scheduling server 220, an execution server 230, data storage 235, a cloud test device 240, and a network 250. Devices/networks of environment 200 may interconnect via wired connections, wireless connections, or a combination of wired and wireless connections.

User device 210 may include a device that is capable of communicating over network 250 with scheduling server 220 and/or execution server 230. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a personal computer; a landline telephone; a gaming device; or another type of computation and communication device.

Scheduling server 220 may include one or more personal computers, workstation computers, server devices, or other types of computation and communication devices. In some implementations, scheduling server 220 may receive a request to test software on cloud test device 240, and may provide the request to cloud test device 240, via the execution server 230 and when cloud test device 240 includes available resources to test the software. In some implementations, scheduling server 220 may lock or prevent particular resources of cloud test device 240 (e.g., a portion of cloud test device 240), which are utilized to test the software, from being utilized by other tests. Cloud test device 240 may test the software, and may generate results based on the test. Cloud test device 240 may provide the results of the test to scheduling server 220, via execution server 230, and scheduling server 220 may provide the results of the test to user device 210. In some implementations, scheduling server 220 may unlock the particular resources of cloud test device 240 (e.g., the portion of cloud test device 240) so that other tests may utilize the particular resources of cloud test device 240.

In some implementations, scheduling server 220 may manage and track resources of cloud test device 240, may queue requests to test software by cloud test device 240, and may cause cloud test device 240 to test software identified by the requests. In some implementations, scheduling server 220 may monitor the software tests by cloud test device 240, and may process results of the software tests. In some implementations, scheduling server 220 may partially utilize resources of cloud test device 240 for a software test, such as by using one or more components of cloud test device 240 (e.g., when cloud test device 240 is a chassis) or by using one or more chasses of cloud test device 240 (e.g., when cloud test device 240 is a data center). In some implementations, scheduling server 220 may fully utilize the resources of cloud test device 240 for a software test. Such resource utilization may enable scheduling server 220 to intelligently queue requests, cause multiple low utilization requests to execute simultaneously, etc.

As further shown, scheduling server 220 may include one or more components, such as, for example, a request manager 221, a queue manager 222, a resource manager 223, an execution engine 224, a system monitor 225, and a result manager 226. In some implementations, scheduling server 220 may include additional components, fewer components, different components, or differently arranged components than those shown in FIG. 2. Furthermore, two or more components of scheduling server 220 may be implemented within a single component, or a single component of scheduling server 220 may be implemented as multiple components. Additionally, one or more of the components of scheduling server 220 may perform one or more functions described as being performed by another one or more components of scheduling server 220.

Request manager 221 may receive requests to test software (e.g., from user device 210), and may determine whether the requested tests have been executed by cloud test device 240, are being executed by cloud test device 240, and/or are queued by queue manager 222. In some implementations, request manager 221 may receive a request to test software from user device 210, and may provide the request to queue manager 222 for providing in a queue of requests to test software. In some implementations, request manager 221 may determine whether the requested test has been executed or is being executed by cloud test device 240 based on information received from execution engine 224 and/or system monitor 225 regarding execution of the requested test. In some implementations, request manager 221 may determine whether a request is queued by queue manager 222 based on information received from queue manager 222. In some implementations, a user of user device 210 may query request manager 221 to determine a status of a request to test software.

Queue manager 222 may receive, from request manager 221, a request to test software on cloud test device 240, and may provide the request in a queue(s) of requests to test software. In some implementations, queue manager 222 may arrange the queue of requests based on priorities allocated to the requests by user(s) of user device(s) 210. In some implementations, queue manager 222 may receive, from resource manager 223, resource availability information associated with resources of cloud test device 240, and may determine whether a next request in the queue may execute on available resources. If cloud test device 240 includes resources to execute a next requested test, queue manager 222 may provide a next request in the queue to execution engine 224. In some implementations, execution engine 224 may query queue manager 222 for the next request in the queue. In some implementations, queue manager 222 may determine whether a requested test can be executed by cloud test device 240 based on types of resources (e.g., a type of processor, memory, etc.) needed for the test, a number of resources needed for the test, etc. In some implementations, queue manager 222 may cancel a requested test, may determine when a requested test will be executed, may modify or disable a requested test, etc.

Resource manager 223 may monitor resources of cloud test device 240 in order to determine availability of the resources of cloud test device 240. Resource manager 223 may automatically provide the determined resource availability to queue manager 222 or when requested by queue manager 222. In some implementations, resource manager 223 may manage utilization of cloud test device 240 by providing a lock on particular resources of cloud test device 240 during execution of a requested test by the particular resources. The lock on the particular resources may prevent other requested tests from utilizing the particular resources while the requested test is being executed. In some implementations, resource manager 223 may reserve one or more resources of cloud test device 240 for executing a requested test, and/or may identify one or more resources of cloud test device 240 as being inoperable. In some implementations, resource manager 223 may cause a resource of cloud test device 240, being used to execute a requested test, to stop executing the requested test and be made available.

Execution engine 224 may query queue manager 222 for a requested test to be executed by cloud test device 240. In some implementations, if queue manager 222 does not include a requested test in the queue, execution engine 224 may wait a particular amount of time before querying queue manager 222 for a requested test. In some implementations, if queue manager 222 provides a requested test to execution engine 224 in response to the query, execution engine 224 may provide the requested test to cloud test device 240 via execution server 230. In some implementations, when execution engine 224 provides the requested test to execution server 230, execution engine 224 may provide, to request manager 221 and/or system monitor 225, information indicating that the requested test has started executing on cloud test device 240.

System monitor 225 may communicate with cloud test device 240, via execution server 230, to determine whether a requested test being executed by cloud test device 240 is still executing. In some implementations, if system monitor 225 determines that the requested test is not being executed and did not generate results, system monitor 225 may provide, to request manager 221, an error message associated with the requested test. In some implementations, system monitor 225 may provide information indicating a status (e.g., executing, completed, etc.) of the requested test to request manager 221, and request manager 221 may provide the information to user device 210. In some implementations, system monitor 225 may instruct resource manager 223 to unlock resources executing the requested test when execution of the requested test is complete.

Result manager 226 may receive, from cloud test device 240 and via execution server 230, results of a requested test being executed by cloud test device 240. In some implementations, the results may include real-time results that are generated while software for the requested test is being tested by cloud test device 240. In some implementations, the results may include final results that are generated after the software for the requested test is tested by cloud test device 240. In some implementations, result manager 226 may provide the results of the requested test to user device 210.

Execution server 230 may include one or more personal computers, workstation computers, server devices, or other types of computation and communication devices. In some implementations, execution server 230 may receive a request to test software on cloud test device 240 from scheduling server 220. Execution server 230 may retrieve, from data storage 235, software identified in the request to test software. In some implementations, execution server 230 may provide the software to cloud test device 240 and may instruct cloud test device 240 to test the software.

Data storage 235 may include one or more storage devices that store information in one or more data structures, such as databases, tables, lists, trees, etc. In some implementations, data storage 235 may store information, such as software to be tested by cloud test device 240, virtualized storage to be tested by cloud test device 240, etc. In some implementations, data storage 235 may be included within execution server 230.

Cloud test device 240 may include one or more personal computers, workstation computers, server devices, or other types of computation and communication devices. In some implementations, cloud test device 240 may include a device that may be implemented in a cloud computing environment that delivers computing as a service, whereby shared resources, services, etc. may be provided to user device 210. In some implementations, cloud test device 240 may receive software and an instruction to test the software from execution server 230. Cloud test device 240 may test the software (e.g., by executing the software), and may generate results based on the test. Cloud test device 240 may provide the results of the test to execution server 230, and execution server 230 may forward the results of the test to scheduling server 220.

Network 250 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, a WiFi network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
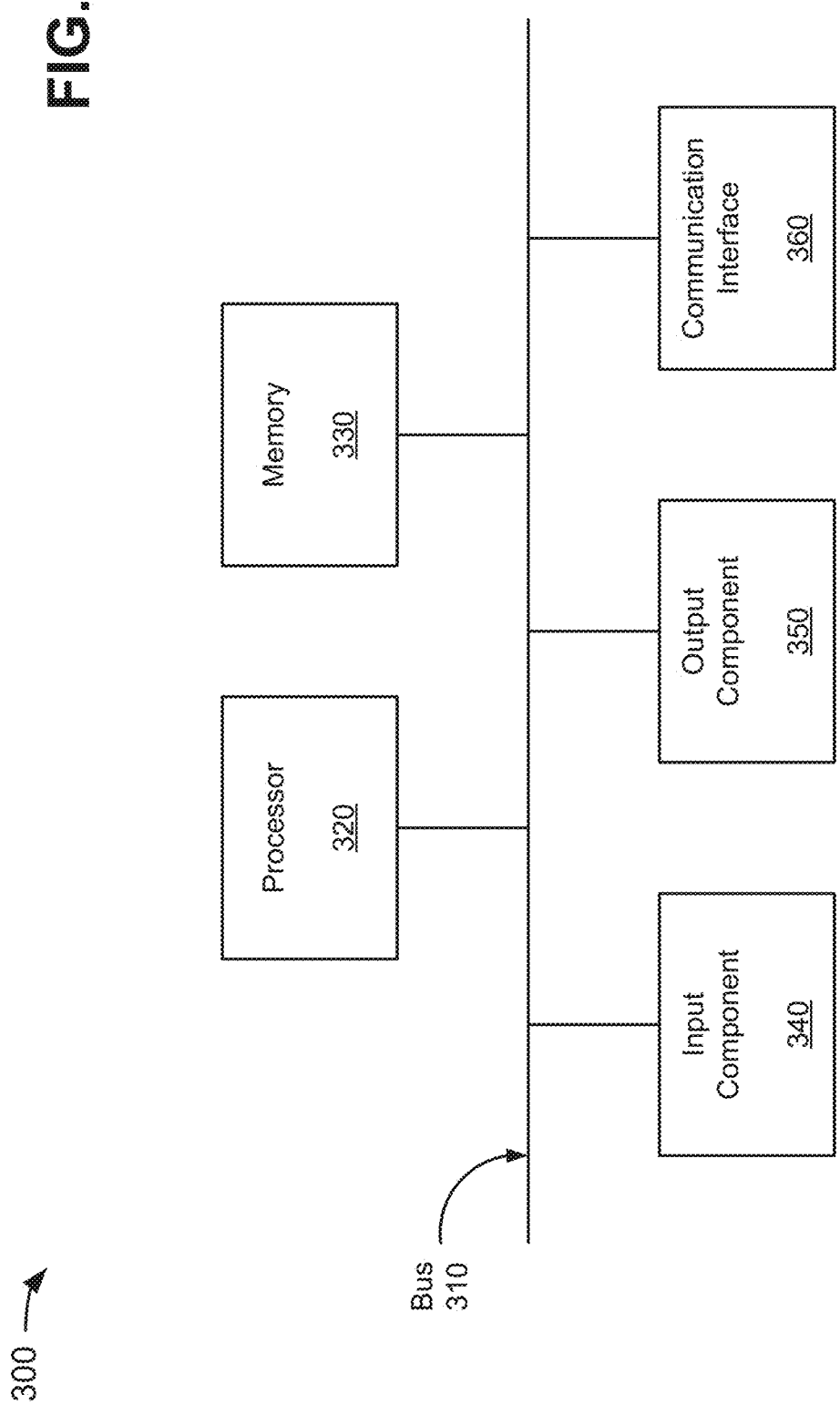
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
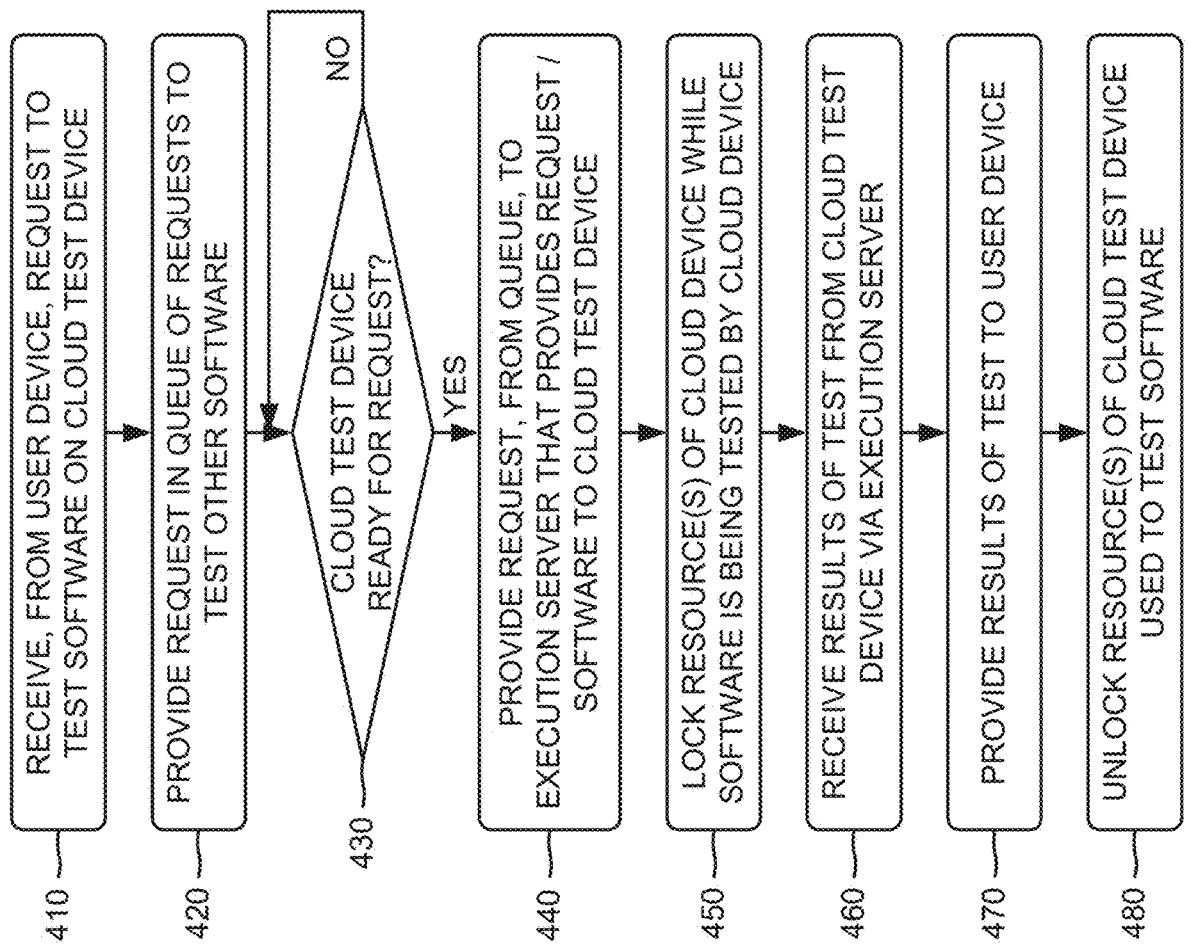
FIG. 4 is a flow chart of an example process for scheduling a test of software to be implemented in a device of a cloud computing environment.

FIG. 4 is a flow chart of an example process 400 for scheduling a test of software to be implemented in a device of a cloud computing environment. In some implementations, process 400 may be performed by scheduling server 220. In some implementations, process 400 may be performed by another device or a group of devices separate from or including scheduling server 220, such as execution server 230.

As shown in FIG. 4, process 400 may include receiving, from a user device, a request to test software on a cloud test device (block 410). For example, a user associated with user device 210 may wish to test software to be implemented in a cloud computing environment. In some implementations, the software may include software for a virtual machine (VM), an application, virtualized storage, a hypervisor, etc. to be implemented in the cloud computing environment. The application may include word processing software, database software, monitoring software, financial software, communication software, and/or any other software capable of being provided via a cloud computing environment. The virtual machine may include a software implementation of a physical machine (e.g., a computer) that executes programs like a physical machine. The virtualized storage may include one or more storage systems and/or one or more devices that use virtualization techniques to enable functionality and advanced features within the storage systems or devices. The hypervisor may provide hardware virtualization techniques that allow multiple operating systems (e.g., "guest operating systems") to execute concurrently on a host computer.

In some implementations, the user may utilize user device 210 to provide the software for storage in data storage 235, and to generate a request to test the software on cloud test device 240. The user may instruct user device 210 to provide the request to scheduling server 220, and scheduling server 220 may receive the request. In some implementations, request manager 221 of scheduling server 220 may receive the request to test the software. In some implementations, the request may include parameters for testing the software, such as, for example, a time period to perform the test (e.g., at night, at particular hours, immediately, etc.), test data for the software, types of resources of cloud test device 240 needed for the test, a number of resources of cloud test device 240 for the test, etc.

As further shown in FIG. 4, process 400 may include providing the request in a queue of requests to test other software (block 420). For example, scheduling server 220 may provide the request to test the software in a queue of requests to test other software on cloud test device 240. In some implementations, the queue may include a data structure (e.g., a table, a database, a list, etc.) that stores requests to test software based on priorities assigned to the requests by users that provided the requests (e.g., the user of user device 210 or other users). For example, the user may designate a priority (e.g., low importance, medium importance, high importance, etc.) for the request to test the software, and scheduling server 220 may provide the request in the queue based on the priority. In some implementations, scheduling server 220 may arrange the requests in the queue based on when the requests are received. For example, scheduling server 220 may provide the requests in a first-in, first-out (FIFO) arrangement in the queue, where a first received request may be provided first, a second received request may be provided second, etc. in the queue. In another example, scheduling server 220 may provide the requests in a last-in, first-out (LIFO) arrangement in the queue, where a last received request may be provided first, a second to last received request may be provided second, etc. in the queue.

In some implementations, request manager 221 may provide the request to test the software to queue manager 222 of scheduling server 220, and queue manager 222 may provide the request to the queue. In some implementations, queue manager 222 may store requests to test software based on priorities assigned to the requests, based on when the requests are received, etc. In some implementations, the requests may be prioritized and/or arranged in the queue based on a number of resources of cloud test device 240 needed for the requests, types of resources of cloud test device 240 needed for the requests, etc. In some implementations, queue manager 222 may be associated with multiple queues, where each queue is associated with a particular priority. Queue manager 222 may provide a request to a corresponding queue based on a priority of the request, and may process a highest priority queue more frequently than lower priority queues.

As further shown in FIG. 4, process 400 may include determining whether the cloud test device is ready for the request (block 430). For example, scheduling server 220 may determine whether cloud test device 220 is ready for a next request provided in the queue. In some implementations, the next request may include a request other than the request to test the software (e.g., provided by user device 210). Assume that the next request includes the request to test the software.

In some implementations, resource manager 223 of scheduling server 220 may monitor resources of cloud test device 240 in order to determine availability of the resources of cloud test device 240. Resource manager 223 may automatically provide the determined resource availability to queue manager 222 or when requested by queue manager 222. In some implementations, resource manager 223 may reserve one or more resources of cloud test device 240 for testing the software identified in the request to test the software.

In some implementations, queue manager 222 may receive, from resource manager 223, resource availability information associated with cloud test device 240, and may determine whether the request in the queue may execute on the available resources. In some implementations, queue manager 222 may determine whether the request to test the software can be executed by cloud test device 240 based on types of resources (e.g., a type of processor, memory, etc.) needed for the test, a number of resources needed for the test, etc. In some implementations, execution engine 224 may query queue manager 222 for the request to test the software.

In some implementations, if a next request in the queue cannot be processed because the required resources for the next request are unavailable, queue manager 222 may determine whether a request after the next request can be processed with the available resources of cloud test device 240. Queue manager 222 may continue through the queue until a request that can be processed with the available resources is identified.

As further shown in FIG. 4, if the cloud test device is not ready for the request (block 430—NO), process 400 may re-perform process block 430 after a particular amount of time. For example, if scheduling server 220 determines that cloud test device 240 is not ready for the request to test the software, scheduling server 220 may wait a particular amount of time (e.g., in seconds, minutes, hours, etc.) before determining whether cloud test device 220 is ready for the request. In some implementations, scheduling server 220 may determine that cloud test device 220 is not ready for the request when cloud test device 220 does not include sufficient available resources to perform the test identified in the request.

In some implementations, queue manager 222 may determine that cloud test device 240 is not ready for the request to test the software based on the resource availability information received from resource manager 223. For example, queue manager 222 may determine that cloud test device 240 is not ready for the request when the resource availability information indicates that cloud test device 220 does not include sufficient available resources to perform the test identified in the request. In some implementations, queue manager 222 may periodically (e.g., after a particular amount of time) review the resource availability information to determine whether cloud test device 240 is ready for the request.

As further shown in FIG. 4, if the cloud test device is ready for the request (block 430—YES), process 400 may include providing the request, from the queue, to an execution server that provides the request and the software to the cloud test device (block 440). For example, if scheduling server 220 determines that cloud test device 240 is ready for the request to test the software, scheduling server 220 may provide the request to execution server 230. In some implementations, execution server 230 may retrieve the software identified in the request from data storage 235, and may provide the software to cloud test device 240. In some implementations, execution server 230 may instruct cloud test device 240 to perform the test of the software based on the request. For example, execution server 230 may instruct cloud test device 240 to perform the test of the software based on the parameters (e.g., a time period to perform the test, test data for the software, types and/or a number of resources for the test, etc.) specified in the request.

In some implementations, queue manager 222 may determine that cloud test device 240 is ready for the request to test the software based on the resource availability information received from resource manager 223. For example, queue manager 222 may determine that cloud test device 240 is ready for the request when the resource availability information indicates that cloud test device 220 includes sufficient available resources to perform the test identified in the request. In some implementations, if queue manager 222 determines that cloud test device 240 is ready for the request, queue manager 222 may provide the request to execution engine 224 of scheduling server 220. Execution engine 224 may provide the request to test the software to execution server 230, and execution server 230 may instruct cloud test device 240 to perform the test of the software, as described above.

As further shown in FIG. 4, process 400 may include locking one or more resources of the cloud test device while the software is being tested by the cloud test device (block 450). For example, scheduling server 220 (e.g., via execution server 230) may instruct cloud test device 240 to lock one or more particular resources of cloud test device 240 that are being used to test the software and while the software is being tested. In some implementations, locking the particular resource(s) of cloud test device 240 may prevent the particular resource(s) from being utilized by other tests while the software is being tested. This may ensure that results generated from testing the software are not corrupted by other tests. In some implementations, resource manager 223 of scheduling server 220 may instruct cloud test device 240 to lock the particular resource(s) of cloud test device 240 during execution of the test by the particular resource(s).

As further shown in FIG. 4, process 400 may include receiving results of the test from the cloud test device and via the execution server (block 460). For example, cloud test device 240 may perform the test of the software, and may generate test results based on performance of the test. In some implementations, cloud test device 240 may provide the test results to execution server 230, and execution server 230 may forward the test results to scheduling server 220. Scheduling server 220 may receive the test results, and may store the test results in memory (e.g., memory 330, FIG. 3) associated with scheduling server 220. In some implementations, the test results may include information indicating whether the software passed or failed the test, data generated by the software during the test, errors generated during the test of the software, etc. For example, if the software includes an application that calculates a solution to a mathematical equation, the test results may include information indicating whether the application calculated a solution, information indicating whether the calculated solution is correct, information indicating whether any errors occurred during calculation of the solution, etc.

In some implementations, result manager 226 of scheduling server 220 may receive the test results generated by cloud test device 240. In some implementations, result manager 226 may receive the test results in real-time (e.g., while software is being tested by cloud test device 240) and/or after testing of the software by cloud test device 240 has completed.

As further shown in FIG. 4, process 400 may include providing the results of the test to the user device (block 470). For example, scheduling server 220 may provide the test results to user device 210, and user device 210 may receive the test results. In some implementations, user device 210 may display the test results to the user. In some implementations, scheduling server 220 may provide the test results to a web page, and the user may utilize user device 210 to access the web page and view the test results. In some implementations, scheduling server 220 may provide a list of test results to user device 210. The list of test results may include information identifying the test results and information identifying other test results. The user may utilize user device 210 to select the test results from the list of test results. Upon selection of the test results from the list, scheduling server 220 may provide the test results to user device 210. In some implementations, result manager 226 may provide the test results to user device 210.

In some implementations, scheduling server 220 may provide a notification (e.g., an email, a text message, etc.) to user device 210 indicating that the test results are available for the user. In some implementations, the notification may include a link that, when selected by the user via user device 210, causes user device 210 to be directed to a user interface (e.g., a web page) that displays the test results.

As further shown in FIG. 4, process 400 may include unlocking the one or more resources of the cloud test device that were used to test the software (block 480). For example, scheduling server 220 (e.g., via execution server 230) may instruct cloud test device 240 to unlock the particular resource(s) of cloud test device 240 that were used to test the software. In some implementations, unlocking the particular resource(s) of cloud test device 240 may enable the particular resource(s) to be utilized by other tests.

In some implementations, system monitor 225 of scheduling server 220 may communicate with cloud test device 240, via execution server 230, to determine whether the software is still being tested by cloud test device 240. In some implementations, if system monitor 225 determines that the software is not being tested and that the test results are generated, system monitor 225 may provide, to resource manager 223, information indicating that the test of the software is complete. In such implementations, system monitor 225 may instruct resource manager 223 to unlock the particular resource(s) of cloud test device 240. Resource manager 223 (e.g., via execution server 230) may instruct cloud test device 240 to unlock the particular resource(s) of cloud test device 240 that were used to test the software.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5C:
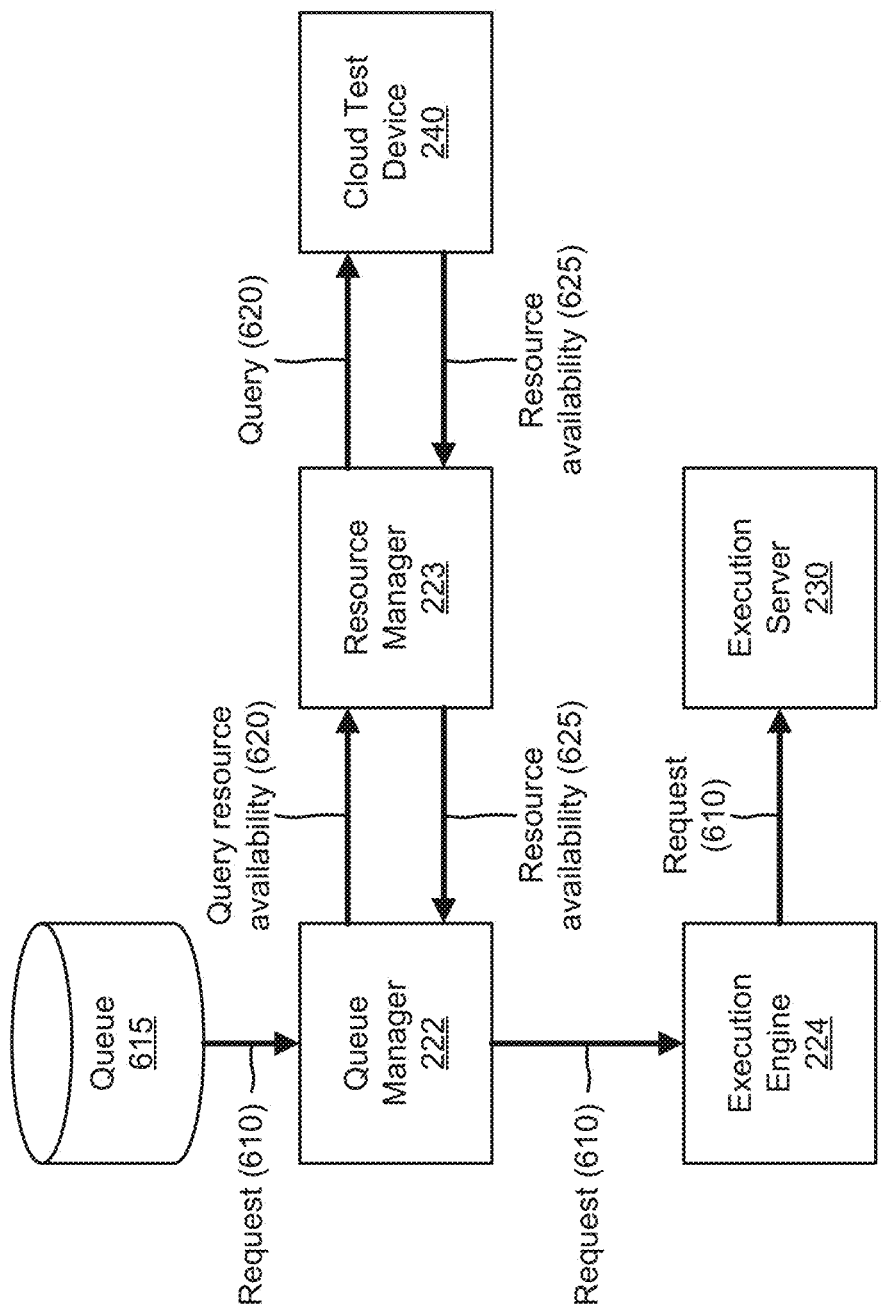

FIGS. 5A-5H are diagrams of an example 500 relating to example process 400 shown in FIG. 4. In example 500, assume that a user, associated with user device 210, wishes to test a virtual machine (VM) that provides new accounting functionality. The user may utilize user device 210 to access a user interface 605, provided by scheduling server 220, which enables the user to designate software to be tested by cloud test device 240, as shown in FIG. 5A. In some implementations, user interface 605 may enable the user to specify parameters (e.g., a time period to perform the test, test data for the software, types and a number of resources of cloud test device 240 for the test, a priority for the test, etc.) for testing the software.

As further shown in FIG. 5A, the user may specify, via user interface 605, software for the new accounting VM as the software to be tested by cloud test device 240. In some implementations, the software for the new accounting VM may perform accounting functions (e.g., financial reporting, budgeting, analysis, etc.) when executed by cloud test device 240. When the user selects a "Submit" item (e.g., a button, an icon, a link, etc.) of user interface 605, user device 210 may provide a request 610 to test the software for the new accounting VM to scheduling server 220. Request 610 may include information identifying the software for the new accounting VM and the parameters for testing the software.

As shown in FIG. 5B, request manager 221 of scheduling server 220 may receive request 610, and may provide request 610 to queue manager 222. Queue manager 222 may store request 610 in a queue 615 that includes other requests to test software received by scheduling server 220. As shown in FIG. 5B, queue 615 may include a table that stores requests to test software based on priorities assigned to the requests by providers of the requests, based on when the requests are received, etc. Assume that queue manager 222 stores the requests to test software in queue 615 based on when the requests are received (e.g., in a FIFO arrangement), and that queue manager 222 stores request 610 last in queue 615 since request 610 is a most recent request received by queue manager 222.

As shown in FIG. 5C, queue manager 222 may periodically (e.g., after a particular amount of time in seconds, minutes, hours, etc.) generate a query 620 for resource availability, and may provide query 620 to resource manager 223 of scheduling server 220. Assume that query 620 requests information associated with availability and types of resources (e.g., hardware, software, storage, computing power, etc.) of cloud test device 240. Resource manager 223 may provide query 620 to cloud test device 240, and cloud test device 240 may generate resource availability information 625 based on query 620, as further shown in FIG. 5C. Cloud test device 240 may provide resource availability information 625 to resource manager 223, and resource manager 223 may forward resource availability information 625 to queue manager 222. Resource availability information 625 may include information associated with availability and types of resources of cloud test device 240.

Queue manager 222 may compare resource availability information 625 with parameters associated with a next request provided in queue 615 to determine whether cloud test device 240 includes available resources to perform a test associated with the next request. Assume that request 610 eventually becomes the next request in queue 615, and that queue manager 222 determines that cloud test device 240 includes available resources to perform the test of the new accounting VM software associated with request 610. Based on this determination, queue manager 222 may provide request 610 to execution engine 224 of scheduling server 220, and execution engine 224 may forward request 610 to execution server 230, as further shown in FIG. 5C. In some implementations, execution engine 224 may query queue manager 222 for the next request in queue 615, and queue manager 222 may provide request 610 to execution engine 224 based on the query.

Figure 5D:
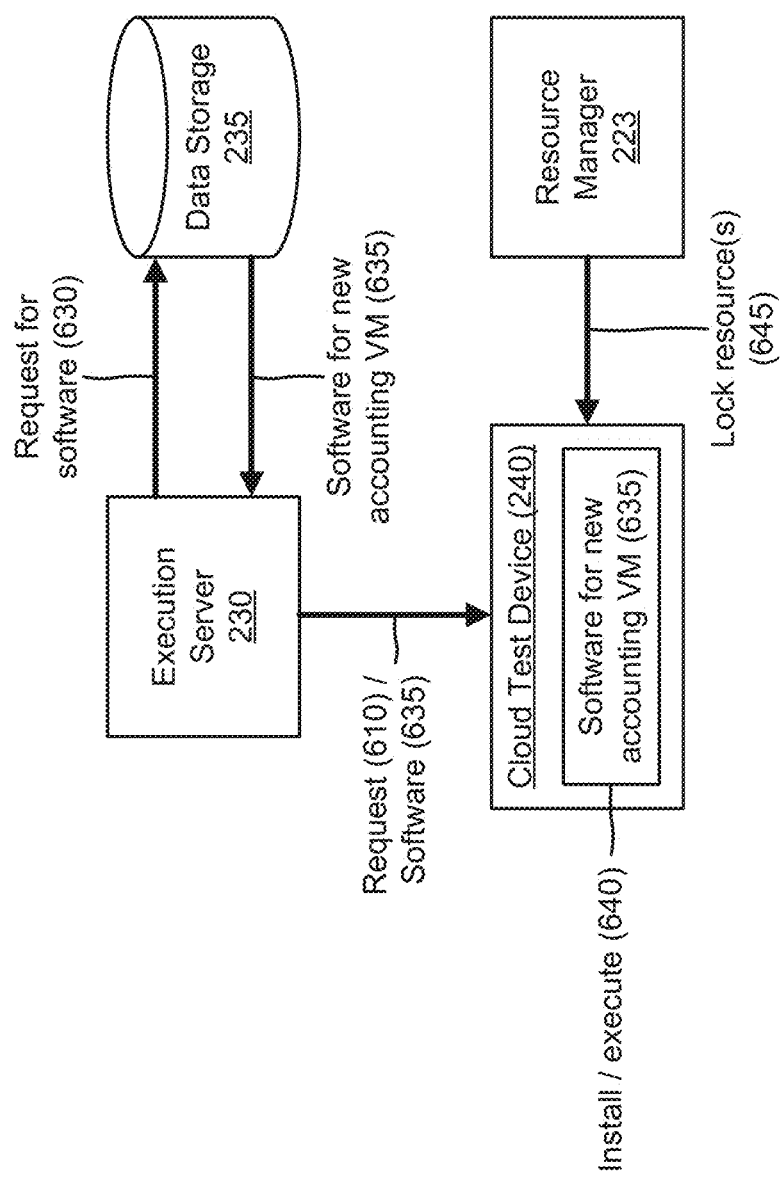

As shown in FIG. 5D, execution server 230 may provide, to data storage 235, a request 630 for the new accounting VM software. Data storage 235 may search for the new accounting VM software based on request 630, and may locate software 635 for the new accounting VM based on the search. Data storage 235 may provide software 635 for the new accounting VM to execution server 230, as further shown in FIG. 5D. Execution sever 230 may provide request 610 and software 635 for the new accounting VM to cloud test device 240, and cloud test device 240 may install and execute software 635 for the new accounting VM, as indicated by reference number 640. For example, cloud test device 240 may create and test the new accounting VM based on software 635 and with one or more particular resources of cloud test device 240. Cloud test device 240 may test the new accounting VM to determine whether the new accounting VM functions properly (e.g., properly generates financial reports, budgets, financial analyses, etc.). As further shown in FIG. 5D, resource manager 223 may cause cloud test device 240 to lock the particular resource(s) used to create and test the new accounting VM, as indicated by reference number 645.

As shown in FIG. 5E, during and/or after testing the new accounting VM, cloud test device 240 may generate results 650 of testing the software for the new accounting VM. Results 650 may include, for example, information indicating whether the new accounting VM performs accounting functions properly, information indicating whether any errors occurred during utilization of the new accounting VM, information indicating a load provided on the particular resource(s) of cloud computing device 240 by the new accounting VM, etc. As further shown in FIG. 5E, cloud test device 240 may provide results 650 to result manager 226 of scheduling server 220, and result manager 226 may provide results 650 to user device 210.

Figure 5F:
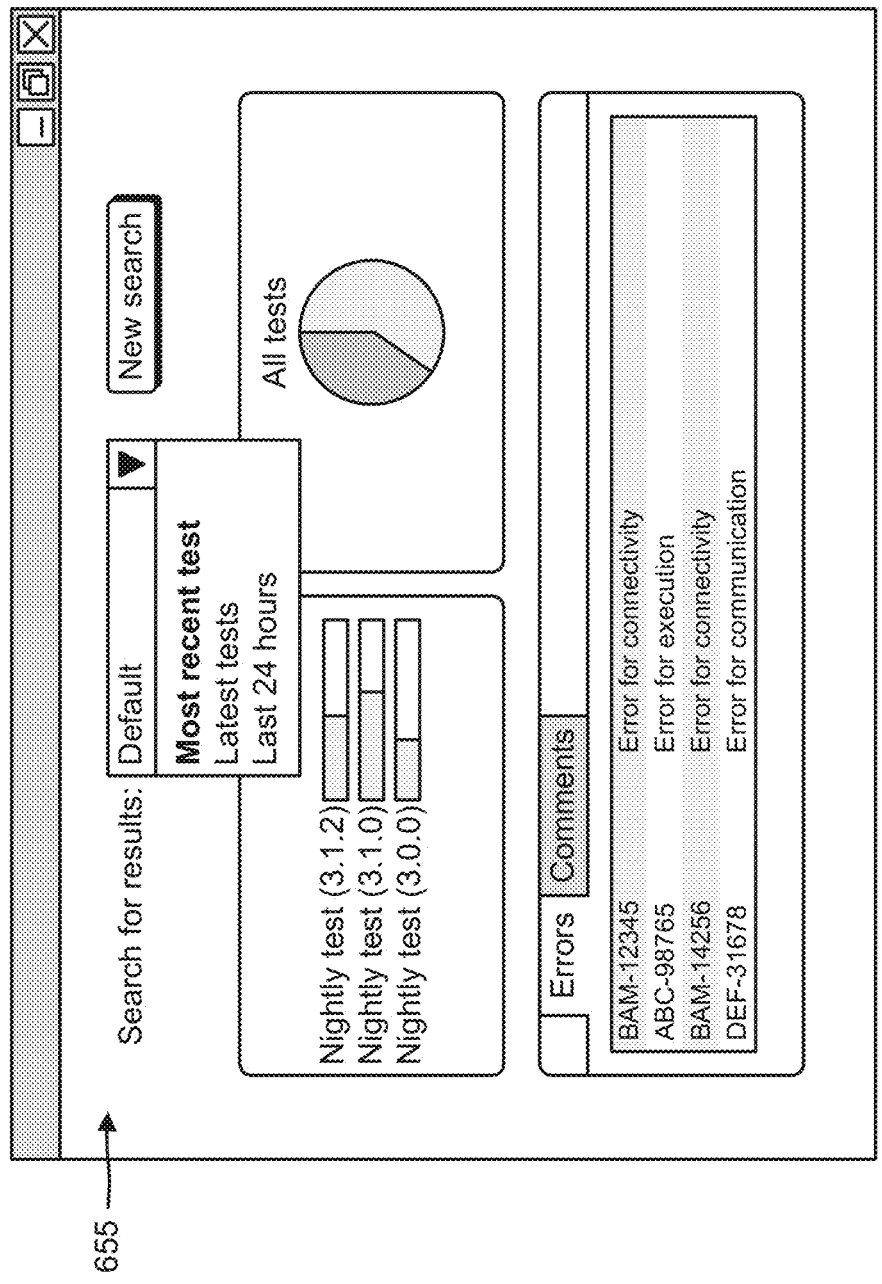

User device 210 may display results 650 to the user in a variety of ways. For example, user device 210 may display results 650 via a user interface 655 as shown in FIG. 5F. User interface 655 may include an item (e.g., a menu, a drop-down menu, etc.) that enables the user to select results of tests performed by cloud test device 240. As shown in FIG. 5F, the user may select a most recent test performed by cloud test device 240, which may correspond to results 650. User interface 655 may include a section that provides errors (e.g., connectivity errors, execution errors, communication errors, etc.) that are associated with results 650. The section may also enable the user to provide comments about results 650. User interface 655 may include a section that provides test status bars indicating whether a particular test passed or failed, and a section that provides a chart or a graph indicating a percentage of all tests that either passed or failed.

Figure 5G:
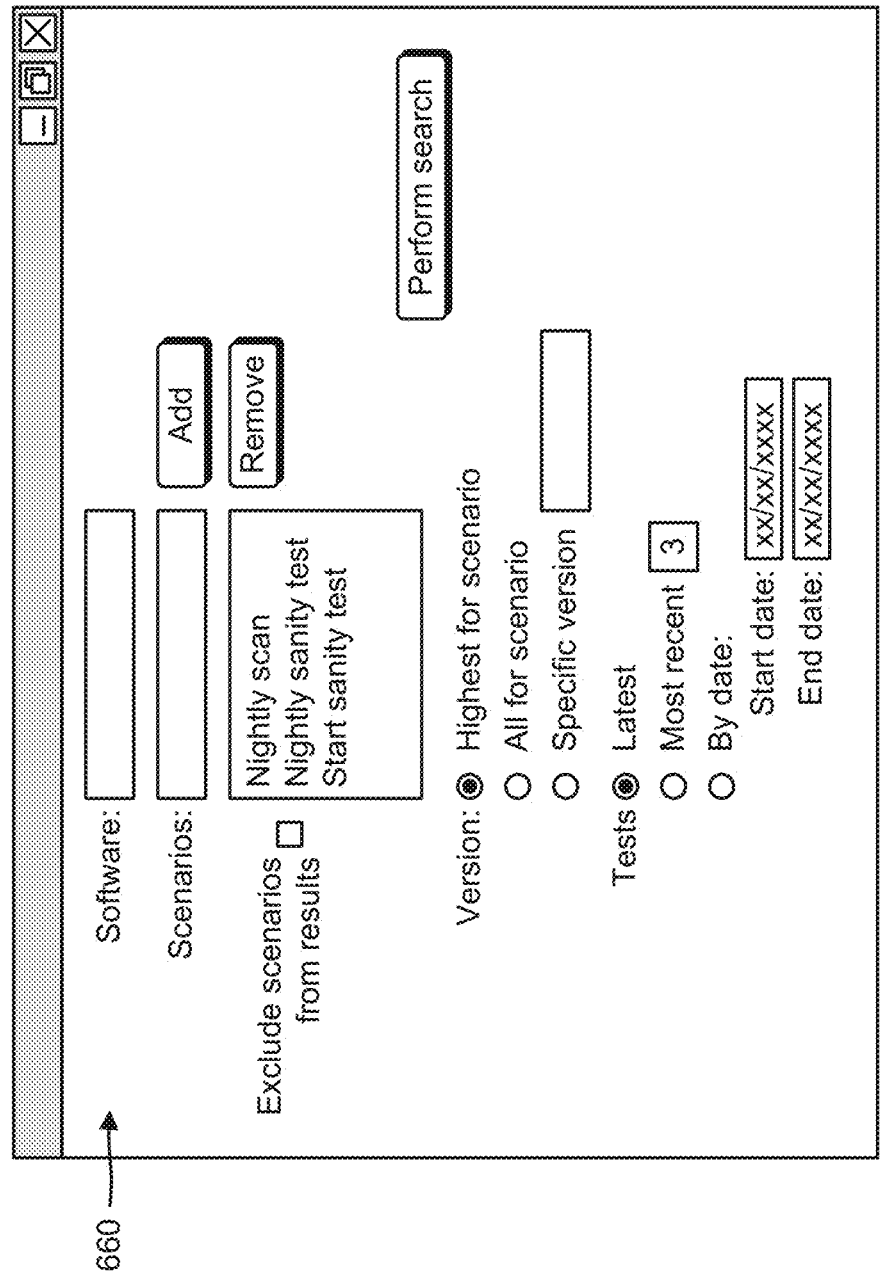

In some implementations, user device 210 may provide a user interface 660, as shown in FIG. 5G, which enables the user to search for results of tests based on search criteria. For example, the user may search for test(s) of particular software by identifying the particular software in a software section of user interface 660. User interface 660 may include a section that enables the user to specify whether to include particular scenarios (e.g., a nightly execution of a test, etc.) in results of the test of the particular software. User interface 660 may include a version section that enables the user to specify a version of the particular software (e.g., a highest version, a specific version, etc.). User interface 660 may include a tests section that enables the user to specify tests of the particular software (e.g., a latest test, a most recent number of tests, tests conducted between a start data and an end date, etc.). After the user specifies the information requested in user interface 660, the user may select a "Perform search" item (e.g., a button, an icon, a link, etc.) that causes user device 210 to search for test(s) of the particular software based on the information. In some implementations, user interface 660 may enable the user to provide specific search criteria that may be reused for one or more other tests.

Figure 5H:
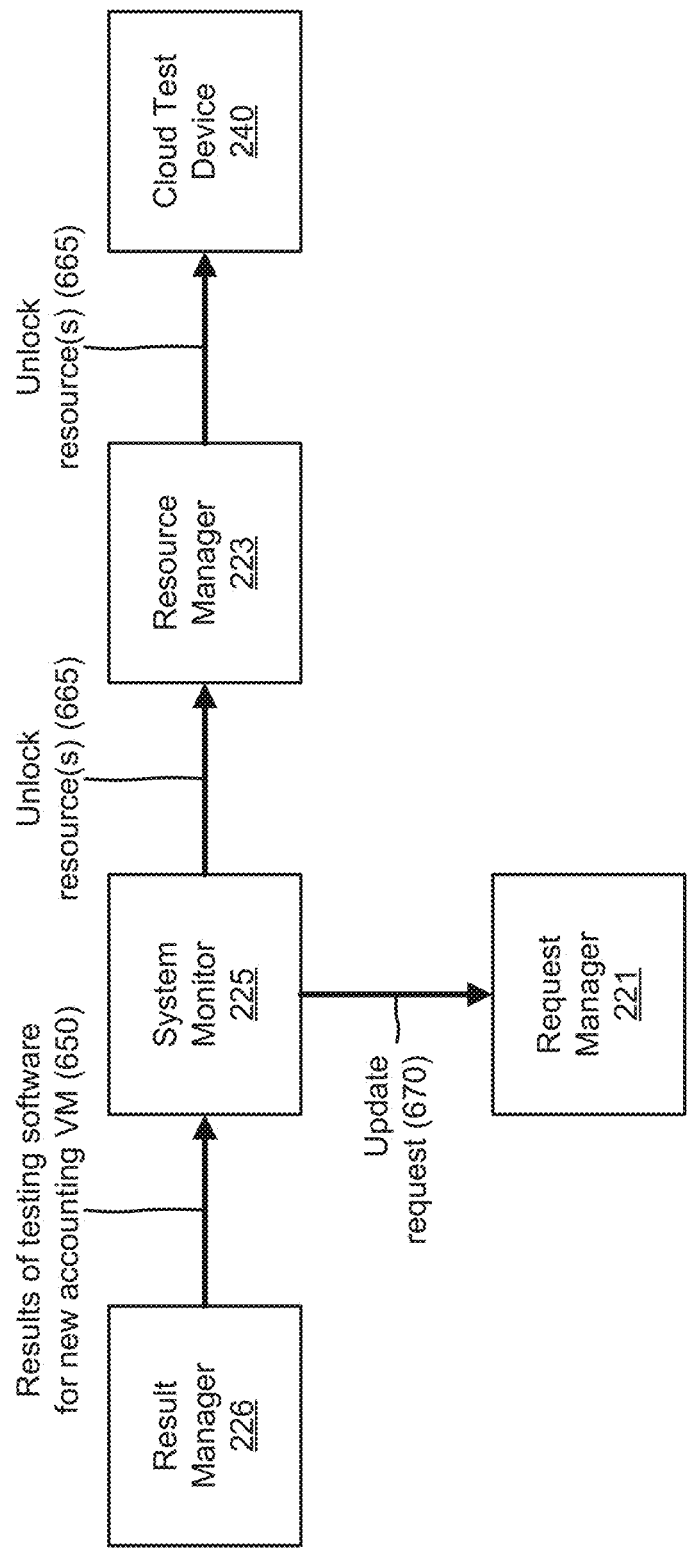

As shown in FIG. 5H, after result manager 226 provides results 650 to user device 210, result manager 226 may provide results 650 to system monitor 225 of scheduling server 220. When system monitor 225 receives results 650, system monitor 225 may determine that the test of the new accounting VM is complete. Based on this determination, system monitor 225 may instruct resource manager 223 to unlock the particular resource(s) used to test the new accounting VM, as indicated by reference number 665. As further shown in FIG. 5H, resource manager 223 may cause cloud test device 240 to unlock the particular resource(s) used to test the new accounting VM, as further indicated by reference number 665. System monitor 225 may also instruct request manager 221 to update request 610, as indicated by reference number 670. For example, request manager 221 may update request 610 to indicate that the test of new accounting VM (e.g., requested by request 610) is complete.

As indicated above, FIGS. 5A-5H are provided merely as an example. Other examples are possible and may differ from what was described with regard to FIGS. 5A-5H. In some implementations, the various operations described in connection with FIGS. 5A-5H may be performed automatically or at the request of the user.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:

1. A method, comprising:
   receiving, by a device and from a user device, a first request to perform a first test of first software on a test device,
   the test device simulating a cloud device provided in a cloud computing environment,
   the test device including a plurality of resources,
   the plurality of resources including at least one unavailable resource, and
   the first software including software to be implemented in the cloud computing environment;
   providing, by the device, the first request in a queue of other requests to test other software on the test device;
   determining, by the device, that a first set of resources, of the plurality of resources, are not available to perform the first request,
   the first set of resources being periodically reviewed, after waiting a particular period of time, when the first set of resources are not available resources to perform the first request, and
   a second test being performed when a second set of resources, of the plurality of resources, are available to perform a second request and the first set of resources are not available to perform the first request,
   the second request being after the first request in the queue,
   the second request being provided to the test device, and
   the second set of resources being utilized to perform the second request;
   and to generate results based on performing the second request;
   locking, by the device, the second set of resources based on the second test being performed;
   receiving, by the device and from the test device, the results based on the second test being performed,
   the results including information indicating whether a second software passed or failed the second test;
   providing, by the device, the results to the user device; and
   unlocking, by the device, the second set of resources based on providing the results to the user device.

2. The method of claim 1, further comprising:
   arranging the first request, the second request, and the other requests in the queue based on when the first request, the second request, and the other requests are received by the device.

3. The method of claim 1, where the first software includes at least one of:
   a virtual machine (VM) to be implemented in the cloud computing environment,
   an application to be implemented in the cloud computing environment,
   virtualized storage to be implemented in the cloud computing environment, or
   a hypervisor to be implemented in the cloud computing environment.

4. The method of claim 1, further comprising:
   providing the results on a web page,
   the user device accessing the web page in order to display the results.

5. The method of claim 1, further comprising:
   periodically monitoring an availability of the plurality of resources of the test device based on a feedback from the first test being performed by the first set of resources.

6. The method of claim 1, further comprising:
   periodically monitoring an availability of the plurality of resources of the test device based on a feedback from the second test being performed by the second set of resources.

7. The method of claim 1, where the first request includes at least one of:
   information regarding a time period to perform the first test;
   information regarding test data for the first software;
   information regarding types of resources needed for the first test; or
   information regarding a number of resources for the first test.

8. A device, comprising:
   a memory; and
   one or more processors to:
   receive, from a user device, a first request to perform a first test of first software on a test device,
   the test device simulating a cloud device provided in a cloud computing environment,
   the test device including a plurality of resources,
   the plurality of resources including at least one unavailable resource, and
   the first software including software to be implemented in the cloud computing environment;
   provide the first request in a queue of other requests to test other software on the test device;
   determine whether a first set of resources, of the plurality of resources, are available to perform the first request;
   the first request and the first software being provided to the test device, via a server device, when the first set of resources are available to perform the first request,
   the first set of resources being utilized to perform the first request and to generate first results based on performing the first request,
   the first set of resources being periodically reviewed, after waiting a particular period of time, when the first set of resources are not available resources to perform the first request, and
   a second test being performed when a second set of resources, of the plurality of resources, are available to perform a second request and the first set of resources are not available to perform the first request,
   the second request being after the first request in the queue,
   the second request being provided to the test device, and
   the second set of resources being utilized to generate second results based on performing the second request;
   selectively lock the first set of resources or the second set of resources based on the first test or the second test being performed,
   the first set of resources being locked when the first test is being performed, and
   the second set of resources being locked when the second test is being performed;

selectively receive, from the test device and via the server device, the first results or the second results based on the first test or the second test being selectively performed,
   the first results being received based on the first test being performed and including information indicating whether the first software passed or failed the first test, and
   the second results being received based on the second test being performed and including information indicating whether a second software passed or failed the second test;
store the first results or the second results in the memory of the device;
provide the first results or the second results to the user device; and
selectively unlock the first set of resources or the second set of resources based on selectively providing the first results or the second results to the user device,
   the first set of resources being unlocked when the first results are provided, and
   the second set of resources being unlocked when the second results are provided.

9. The device of claim 8, where the one or more processors are further to:
   arrange the first request, the second request, and the other requests in the queue based on priorities associated with the first request, the second request, and the other requests.

10. The device of claim 8, where, when providing the first results or the second results, the one or more processors are to:
   provide the first results or the second results on a web page,
      the user device accessing the web page in order to display the first results or the second results.

11. The device of claim 8, where the one or more processors are further to:
   periodically monitor an availability of the plurality of resources of the test device based on a feedback from the first test being performed by the first set of resources.

12. The device of claim 8, where the one or more processors are further to:
   periodically monitor an availability of the plurality of resources of the test device based on a feedback from the second test being performed by the second set of resources.

13. The device of claim 8, where the first software includes at least one of:
   a virtual machine (VM) to be implemented in the cloud computing environment,
   an application to be implemented in the cloud computing environment,
   virtualized storage to be implemented in the cloud computing environment, or
   a hypervisor to be implemented in the cloud computing environment.

14. The device of claim 8, where requests in the queue are prioritized based on priorities assigned by one or more users providing the requests.

15. A computer-readable medium for storing instructions, the instructions comprising:
   one or more instructions that, when executed by one or more processors of a device, cause the one or more processors to:
      receive, from a user device, a first request to perform a first test of a first software on a test device,
         the test device simulating a cloud device provided in a cloud computing environment,
         the test device including a plurality of resources,
            the plurality of resources including at least one unavailable resource, and
         the first software including software to be implemented in the cloud computing environment;
      provide the first request in a queue of other requests to test other software on the test device;
      determine whether a first set of resources, of the plurality of resources, are available to perform the first request;
         the first request and the first software being provided to the test device when the first set of resources are available to perform the first request,
            the first set of resources being utilized to perform the first request and to generate first results based on performing the first request,
         the first set of resources being periodically reviewed, after waiting a particular period of time, when the first set of resources are not available resources to perform the first request, and
         a second test being performed when a second set of resources, of the plurality of resources, are available to perform a second request and the first set of resources are not available to perform the first request,
            the second request being after the first request in the queue,
            the second request being provided to the test device, and
            the second set of resources being utilized to generate second results based on performing the second request;
      selectively lock the first set of resources or the second set of resources based on the first test or the second test being selectively performed,
         the first set of resources being locked when the first test is being performed, and
         the second set of resources being locked when the second test is being performed;
      selectively receive, from the test device, the first results or the second results based on the first test or the second test being selectively performed,
         the first results being received based on the first test being performed and including information indicating whether the first software passed or failed the first test, and
         the second results being received based on the second test being performed and including information indicating whether a second software passed or failed the second test;
      provide the first results or the second results to the user device; and
      selectively unlock the first set of resources or the second set of resources based on selectively providing the first results or the second results to the user device,
         the first set of resources being unlocked when the first results are provided, and the second set of resources being unlocked when the second results are provided.

16. The computer-readable medium of claim 15, where the one or more instructions, when executed by the one or more processors, further cause the one or more processors to:

arrange the first request, the second request, and the other requests in the queue based on priorities associated with the first request, the second request, and the other requests and in an order based on when the first request, the second request, and the other requests are received.

17. The computer-readable medium of claim 15, where the first software includes at least one of:

a virtual machine (VM) to be implemented in the cloud computing environment, an application to be implemented in the cloud computing environment, virtualized storage to be implemented in the cloud computing environment, or a hypervisor to be implemented in the cloud computing environment.

18. The computer-readable medium of claim 15, where the one or more instructions, when executed by the one or more processors, further cause the one or more processors to:

provide the first results or the second results on a web page,
the user device accessing the web page in order to display the first results or the second results.

19. The computer-readable medium of claim 15, where the one or more instructions, when executed by the one or more processors, further cause the one or more processors to:

periodically monitor an availability of the plurality of resources of the test device based on a feedback from the first test being performed by the first set of resources.

20. The computer-readable medium of claim 15, where requests in the queue are prioritized based on at least one of:

information regarding types of resources needed for the requests, or information regarding a number of resources needed for the requests.

\* \* \* \* \*